No. 695,639. Patented Mar. 18, 1902.
C. P. GOERZ.
PHOTOGRAPHIC ROLL HOLDER.
(No Model.) 2 Sheets—Sheet 1.

Witnesses:
H. Joseph Doyle
A. H. Brown

Inventor:
Carl Paul Goerz,
by Marion & Marion
Attorneys.

No. 695,639. Patented Mar. 18, 1902.
C. P. GOERZ.
PHOTOGRAPHIC ROLL HOLDER.

(No Model.) 2 Sheets—Sheet 2.

Witnesses:

Inventor:
Carl Paul Goerz
by Marion & Marion
Attorneys.

UNITED STATES PATENT OFFICE.

CARL PAUL GOERZ, OF FRIEDENAU, GERMANY.

PHOTOGRAPHIC-ROLL HOLDER.

SPECIFICATION forming part of Letters Patent No. 695,639, dated March 18, 1902.

Application filed May 1, 1901. Serial No. 58,318. (No model.)

*To all whom it may concern:*

Be it known that I, CARL PAUL GOERZ, a citizen of the Kingdom of Prussia, and a resident of Friedenau, near Berlin, Germany, (whose post-office address is Rheinstrasse 45/46,) have invented certain new and useful Improvements in Photographic-Roll Holders, of which the following is a specification.

The object of the present invention is a roll-film magazine for photographic cameras by the peculiar construction of which the introduction of the film-spools is easily done and the volume of the magazine is considerably reduced. Furthermore, the magazine has a device for puncturing the film at the end of each exposed part by means of which the operator in the dark chamber easily finds the place where to cut the film.

Figure 1:
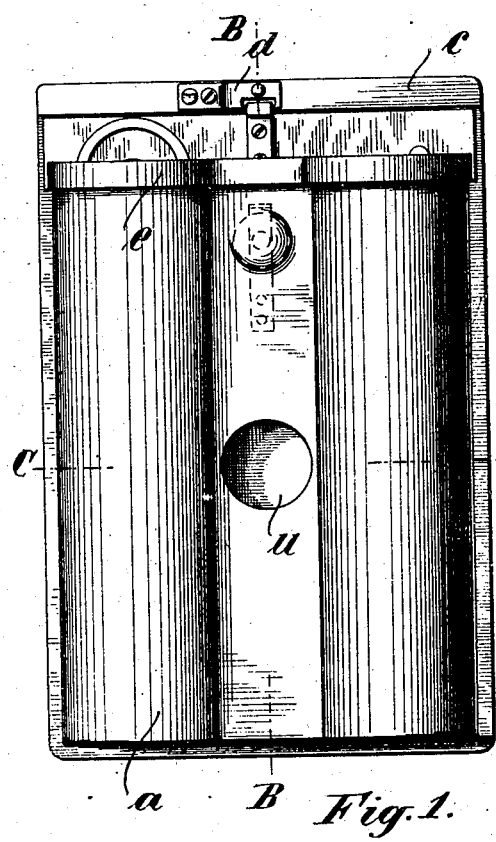
Figure 2:
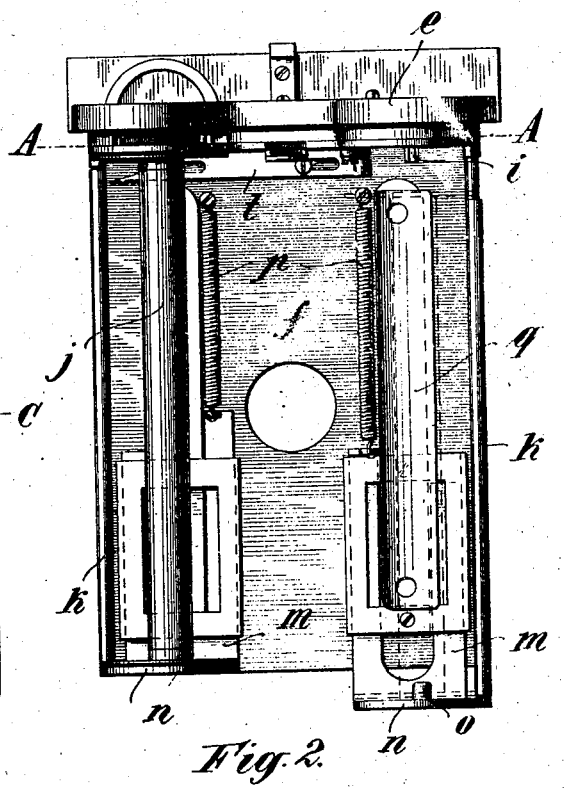
Figure 3:
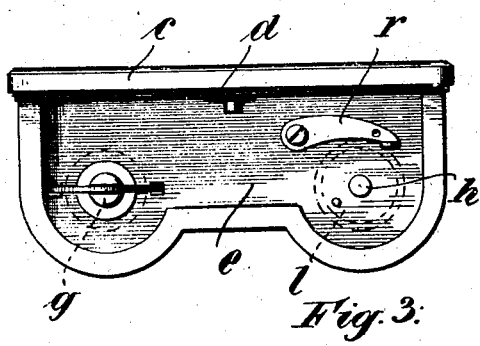
Figure 4:
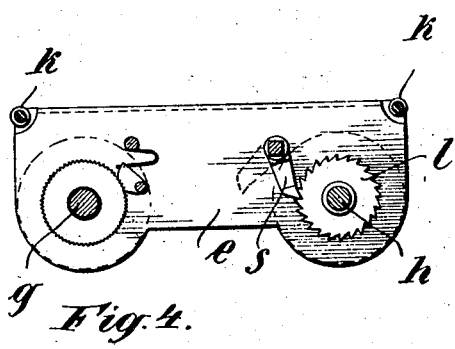
Figure 5:
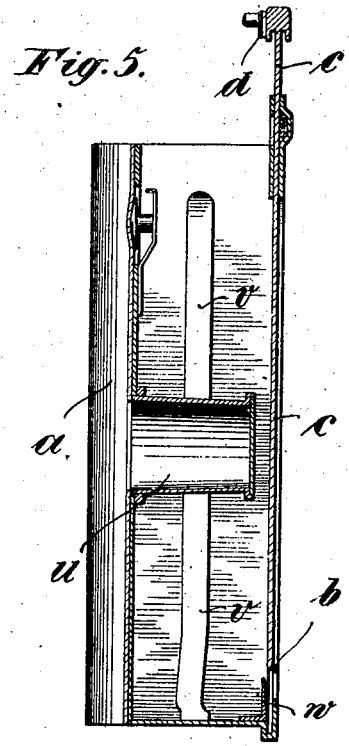
Figure 6:
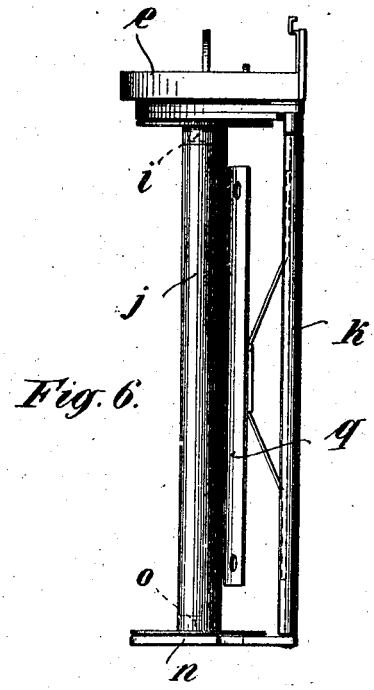
Figure 8:
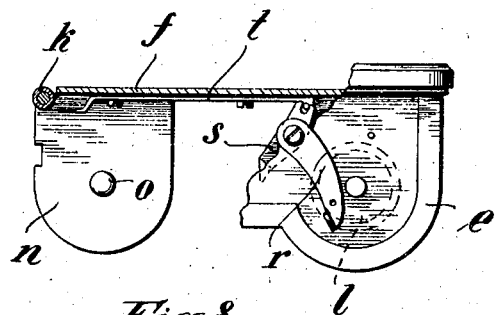
Figure 9:
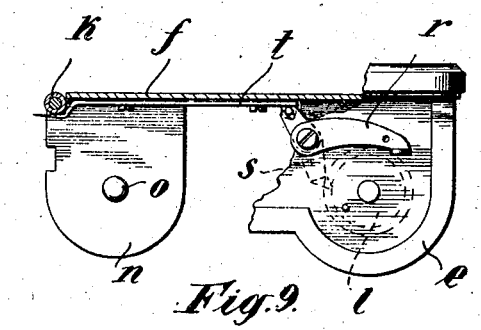
Figure 7:
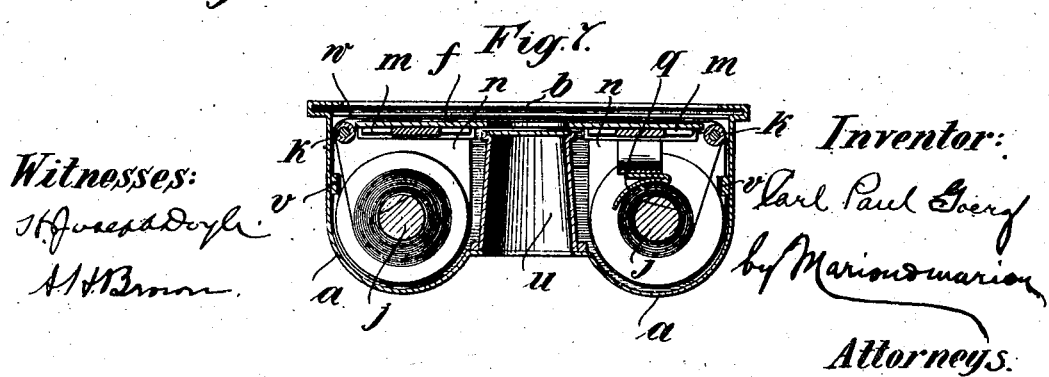

In the accompanying drawings, Figure 1 shows the magazine as seen from the back. Fig. 2 shows the inner part, containing the spools, removed from the casing. Fig. 3 is a top view of Fig. 1; Fig. 4, a section on line A A of Fig. 2. Fig. 5 is a section on line B B of Fig. 1; Fig. 6, a side elevation of Fig. 2 seen from the right. Fig. 7 is a horizontal section through line C C of Fig. 1, the shutter removed. Figs. 8 and 9 show top views of Fig. 2, the upper plate partly broken away and showing the perforating mechanism in different positions.

$a$ is a casing of preferred cross-section, (represented in Figs. 1, 2, and 7,) open at one of its short narrow sides. The flat front side is cut out to form an opening or window $b$, which ordinarily is closed by a light-tight shutter $c$. A catch-spring $d$ holds this shutter in its closed position. The open narrow side is closed by a cover $e$, to which is fastened a wall $f$, which when the cover is put over the open side of the casing stands parallel to and at a very short distance from the flat side of the casing. In the center of the semicircular parts of said cover $e$ are arranged short pins $g$ and $h$, provided at their inner ends with an angular stud or spool center $i$, of suitable form, adapted to engage the film-spools $j j$. One of these pins $g$ has at its upper end a ring by means of which it may be turned. A ratchet allows the ring and the spool to be turned only in one direction. At the edges of the wall $f$ there are arranged rollers $k$ to prevent the film from rubbing on the sharp edges. The pin $h$ is also provided with a ratchet-wheel $l$, the purpose of which will be hereinafter explained. In the lower part of the wall $f$ there are movably held by proper guidings two plates $m$, having upturned semicircular flaps $n$ with pins $o$ in their centers for engaging the core of the film-spools $j$. Springs $p$ draw these plates $m$ toward the inside.

$q$ is a fluted spring-pressed strip which presses against the circumference of the right spool, carrying the fresh film, and acts as a brake. The film of this right spool $j$ is drawn over the right edge of the wall $f$, passes underneath the opening or window $b$, over the other edge of the wall $f$ to the left spool $j$, and may be by turning the ring shifted after each exposure so much as to bring a non-exposed part of it in front of the opening or window.

In order to tighten the film stretched over the wall $f$, the following arrangement is provided: On the cover is arranged a lever $r$, the pivot of which bears a pawl $s$, which may engage the ratchet-wheel $l$ when turned into the position shown in Fig. 9, but which sets it free when taking the position Fig. 8. If in the first position, the film may be tightened to any desired degree by turning the pin $g$ by means of the ring. Said pawl $s$ has a rearward prolongation which engages an arm $t$, guided in the wall $f$ and provided with a sharp point. By turning the lever $r$ into the position Fig. 9 this arm is advanced toward the left side and its point penetrates the film. By tightening the latter a mark is torn into the film, which indicates exactly to the operator the place where the film is to be cut.

The short tube $u$, provided with a red glass pane, serves for observing the numbers printed on the light-proof paper interposed between the spirals of the film.

$v$ represents guide-rails for bringing the inner part of the magazine into its exact position. If they were completely straight, the lower edge of the film passed over $f$ would be easily damaged on the lower edge $w$ of the window $b$. The guide-rails are therefore curved slightly toward the back, so that the wall $f$ is withdrawn slightly rearward from said lower edge $w$ when the edge of the film passes over it and only after having completely passed the guidings turn again to their former line.

What I claim is—

1. In a photographic-roll holder, the combination with a casing having one end closed, one of its sides being open, and guides located adjacent to said open side; of a removable roll-holder comprising a cover for the open end of said casing, said cover carrying a depending wall of a length to rest on the lower end of the casing when in position; film holding and moving mechanism carried by said cover and wall and removable therewith; and guides carried by said casing adapted to move the lower end of said roll-holder temporarily out of alinement with the normal position of the holder during its movement, at a point adjacent to the lower end of the casing.

2. In a photographic-roll holder, the combination with a casing having one end closed, one of its sides being open, and guides located adjacent to said open side; of a removable roll-holder comprising a cover for the open end of said casing, said cover carrying a depending wall of a length to rest on the lower end of the casing when in position; spring-actuated slides located at the lower end of said wall, said cover and slides having opposing spool-bearings; winding mechanism carried by said cover for winding the film from one of the spools; and guides carried by said casing adapted to move the lower end of said roll-holder temporarily out of alinement with the normal position of the holder, at a point adjacent to the lower end of the casing.

3. In a photographic-roll holder, the combination with a casing having one end closed, one of its sides being open, and guides located adjacent to said open side; of a removable roll-holder comprising a cover for the open end of said casing, said cover carrying a depending wall of a length to rest on the lower end of the casing when in position; sliding spool-supports carried by said wall; a ratchet mechanism movable into and out of operative connection with one of the spools for holding the film taut; a film-perforating mechanism connected to and operable with said ratchet mechanism; and guides carried by said casing adapted to move the lower end of said roll-holder temporarily out of alinement with the normal position of the holder, at a point adjacent to the lower end of the casing.

4. In a photographic-roll holder, an outer casing, guide-rails for the inner part attached to the longer narrow sides of the said casing and having their lower ends curved toward the back, and the depending wall $f$, all substantially as shown and described.

In testimony whereof I affix my signature in presence of two witnesses.

CARL PAUL GOERZ.

Witnesses:
 WOLDEMAR HAUPT,
 HENRY HASPER.